July 17, 1962 S. BRAND 3,045,218

MAGNETIC DATA RECORDING MEANS

Filed Nov. 23, 1956 5 Sheets-Sheet 1

INVENTOR
SAMUEL BRAND

BY Joseph J. Nobbins
ATTORNEY

INVENTOR
SAMUEL BRAND
BY Joseph J. Robbins
ATTORNEY

July 17, 1962 S. BRAND 3,045,218

MAGNETIC DATA RECORDING MEANS

Filed Nov. 23, 1956 5 Sheets-Sheet 3

INVENTOR
SAMUEL BRAND

BY Joseph J. Robbins
ATTORNEY

MAGNETIC DATA RECORDING MEANS

Filed Nov. 23, 1956 5 Sheets-Sheet 4

INVENTOR
SAMUEL BRAND
BY
Joseph J. Robbins
ATTORNEY

INVENTOR
SAMUEL BRAND
BY
Joseph J. Robbins
ATTORNEY

United States Patent Office 3,045,218

Patented July 17, 1962

3,045,218

MAGNETIC DATA RECORDING MEANS

Samuel Brand, 48 Crary Ave., Binghamton, N.Y.

Filed Nov. 23, 1956, Ser. No. 624,152
8 Claims. (Cl. 340—174.1)

This invention relates to data recording means, particularly to magnetic recording means for impressing data coding magnetic signals or spots on a magnetic record medium, and more particularly to such magnetic recording means in combination with means for printing the data in legible form.

The magnetic record medium is visualized as having code or index positions or areas grouped into item fields. An item such as a letter, digit, other symbol, or other function item can be presented by magnetization of one or a combination of the index areas of an item field in accordance with a chosen single-position or combination-of-positions code.

An object of the invention is to provide a printing and magnetic recording apparatus having a plurality of selectively operable, movably mounted type and magnet bearing elements, characterized in that each element is provided with a character type and in fixed offset relation to the type with a corresponding character coding permanent magnet arrangement, the type and magnet arrangement respectively to make printing impact and concurrent magnetic recording impact with respectively offset record areas, and further characterized in that said elements are of magnetizable material integrally formed with polarized permanent magnet recording heads in various character coding combinational patterns and constituting the permanent magnet arrangements. The permanent magnet heads are preferably bi-polar record striking heads to improve isolation of the magnetic fields from the type on the same type and magnet bearing element. According to the invention, some of the magnetic recording heads have a width commensurate with the width of a single code index area while others have a multiple width commensurate with the aggregate width of a plurality of contiguous index areas.

The apparatus utilizes magnetic signal erasing means. The polarity of the data signals is determined by the polarity of the permanent magnet recording heads. To facilitate subsequent erasure of the data signals by the erasing means of the invention, all the recording magnets will have the same polarity and hence all the data signals will have like polarity. The erasing means involves permanent magnets having a polarity reverse to that of the recording magnets. The erasing means will be arranged so that in close juxtaposition with an item field they will apply reverse magnetic effects to all the index areas of the field, erasing any operative data signal therefrom. The playback means, which is no part of the present invention, will be made sensitive only to the positive data signals and will be insensitive to the reverse or negative signals produced by the erasing means.

An object of the invention also is to provide printing, magnetic recording and erasing apparatus characterized in that operation of the magnetic erasing means will be attended by operation of overprinting means for the printed items. Upon magnetic erasure of an item field, the overprinting means will apply an overprint, such as an X mark, to the printed item whose coding signal pattern is being erased from the item field. Before replacing the erased items with new items, the overprints and the overprinted items will be erased from the ink-impressionable record surface. New items may then be printed in the erased spaces and the corresponding magnetic signal patterns coordinately recorded in the related item fields.

While not limited to it, the invention contemplates the printing of lines of data in superimposed or overlapping relation to the rows of data coding magnetic signal patterns which constitute the record fields, whereby the printed data and their encoding magnetic signal patterns may be recorded within a minimum length of the record sheet.

In one form, the invention embodies permanent magnets as built-in elements of a typewriter. The magnetic record medium will be a strip of paper having an ink-impressionable front surface and coated on the rear surface with magnetic material such as iron oxide. The index areas will be in rows across the record and in columns lengthwise of the record. Each type bar for printing a character or data item will be provided near the type engraving with a fixed combination of permanent magnet recording heads for magnetically impressing the item coding magnetic signal pattern in an item field during the printing of the item in a character space. A feature of the invention is that the magnetic recording heads on a type and magnet bearing element project forwardly of the type, so that when the element is propelled to effect printing and magnetic recording impact with the record, the magnetic heads will indent the front surface of the record to attain close magnetic recording proximity to the magnetic material behind the front surface. The recording magnets preferably will be located on the type bars below the types, so that the top line of printing will be in the clear, the second line of printing will be in superimposed relation to the row of signal patterns for the top line of printing, the third line of printing will be superimposed relative to the second row of signal patterns, and so on, with the bottom line of signal patterns remaining in the clear. Any suitable code can be used and the type bars be provided with the proper permanent magnet arrangements for giving effect to the code. Specifically, an eight-position code will be used and an item field will be composed of two adjacent columns of index areas, four areas in each column. A row of these item fields across the record will compose a record field. An Erase key will be depressed to operate a type bar provided with the overprint mark and with the erase magnets. A special key and type bar will be operated automatically to apply a monitor signal pattern to a side of each record field. The special type bar need not be equipped with any type engraving since printing will not be required of it but it will be provided with a group of permanents magnets arranged to apply four positive magnetic signals, each signal in line with one of the four rows of index areas within a record field.

Other objects and advantages of the invention will become clear from the ensuing description and claims and from the drawings.

Figures 16, 17, 18, 19, 20, 21:
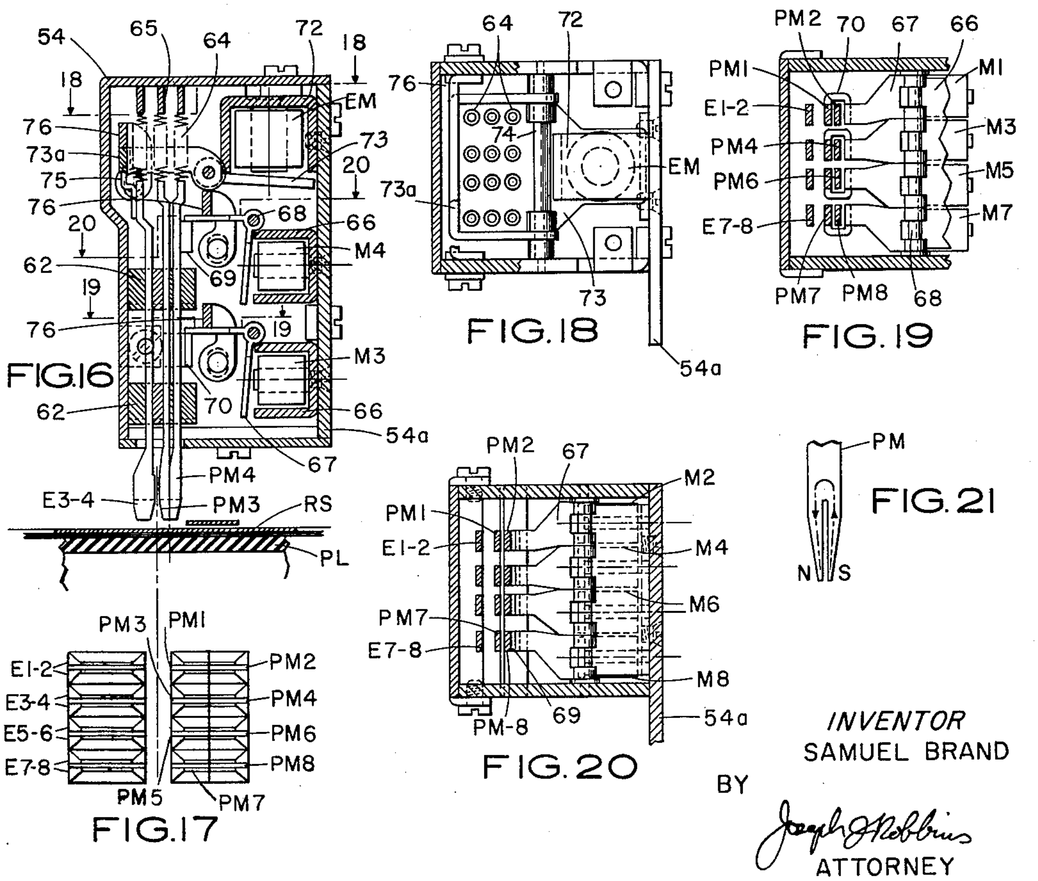
FIG. 16 is a section substantially along line 16—16 of FIG. 14.
FIG. 17 is a bottom view of the permanent recording and erasing heads or contact ends, on a magnified scale.

FIGS. 18, 19 and 20 are sections, respectively, along lines 18—18, 19—19 and 20—20 of FIG. 16.

FIG. 21 is a fragmentary side view of the head of a permanent recording magnet used in the alternative embodiment.

Figure 22:
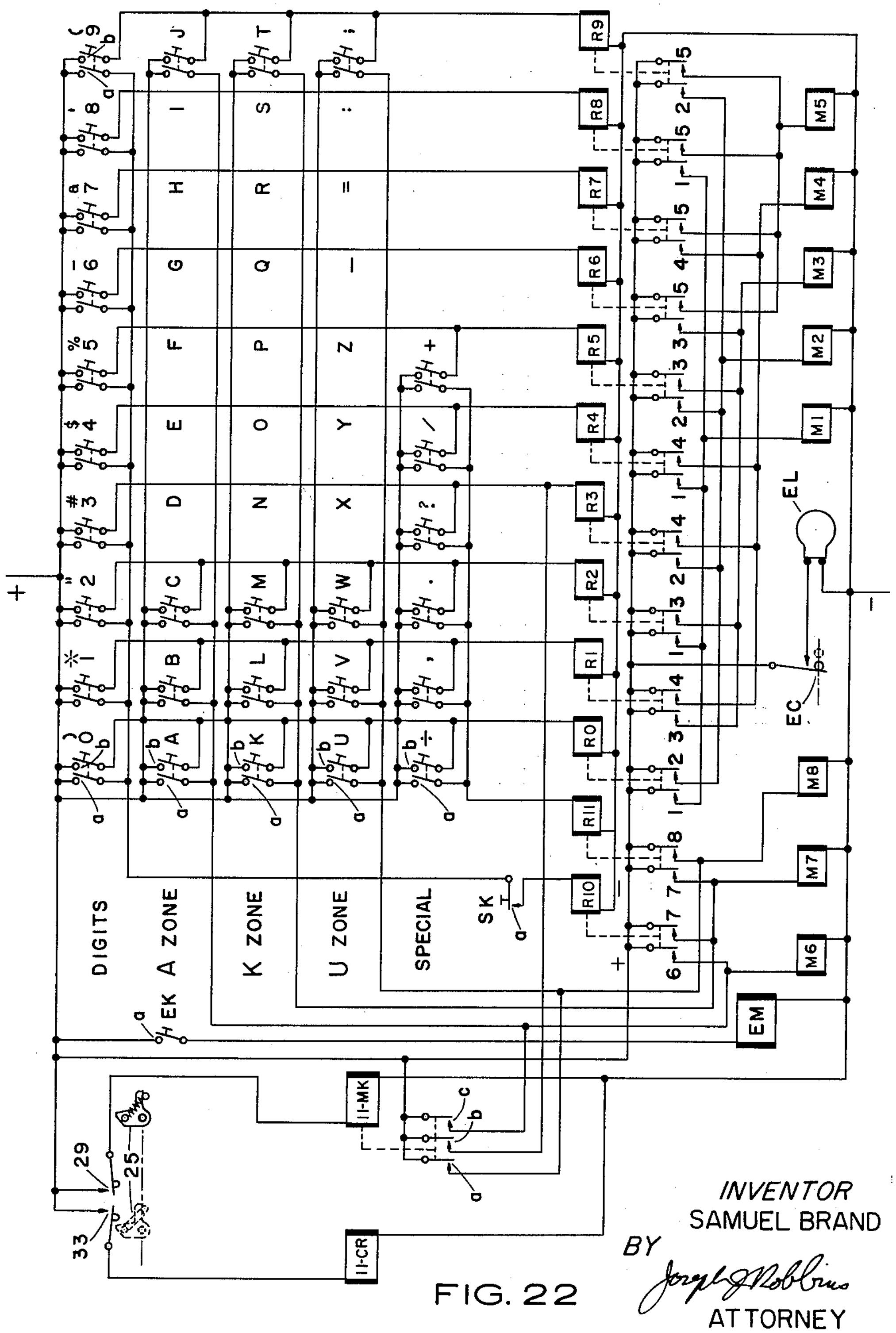

FIG. 22 shows the circuit diagram of the alternative embodiment.

The first embodiment of the invention, shown in FIGS. 1 to 11, involving permanent recording and erasing magnets integrally incorporated in the typewriter will now be described in detail.

Figure 1:
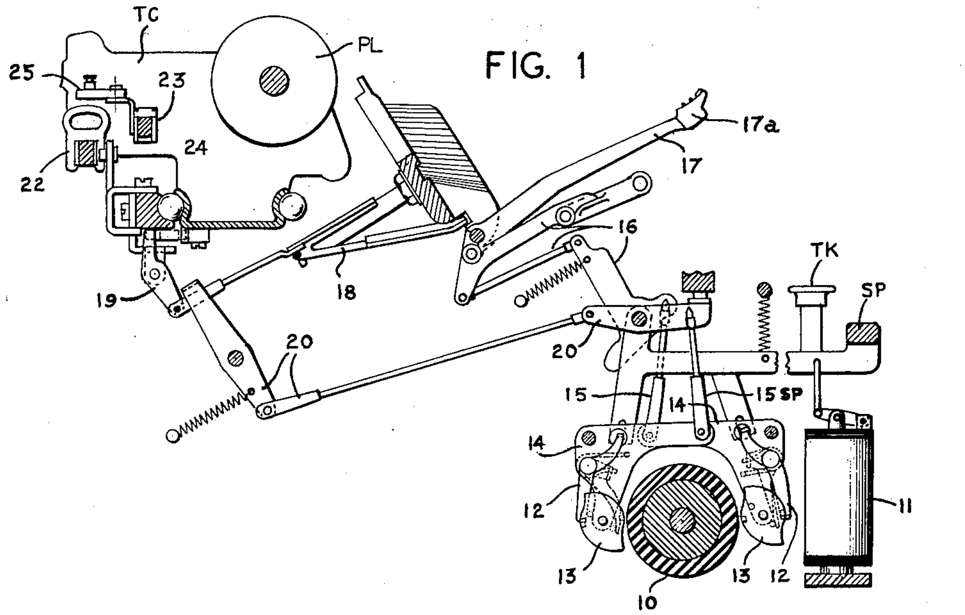
FIG. 1 is a vertical sectional view through a power typewriter integrally incorporating the magnetic recording and erasing means.
Figure 2:
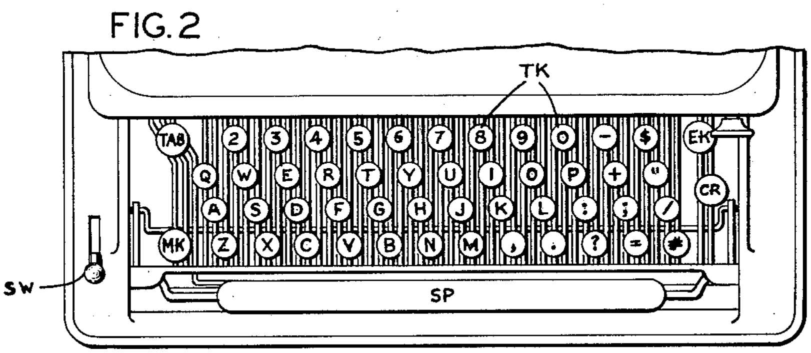
FIG. 2 is a plan view of the keyboard of this typewriter.

The typewriter chosen as illustrative is of the power type whose general principles are disclosed in Patents 1,777,055 and 1,873,512. When a toggle switch lever SW (FIG. 2) is in "on" position, it brings into operation a motor (not shown) for continuously rotating a friction shaft 10 (FIG. 1). The keyboard includes the usual item or character keys TK, the space bar SP, the tab spacing key TAB, and the carriage return key CR. The shift keys are omitted or disabled since the typewriter is set for single case operation. Two special keys are provided, an erase key EK and a monitor signal key MK. The keyboard elements, keys TK, TAB, CR, EK and MK and space bar SP are manually operable. Alternatively, these keyboard elements may be automatically operated by respectively associated solenoids 11 when selectively energized by suitable call circuits in a known manner. Automatic or manual depression of a keyboard element releases a latch 12 from a cam 13, permitting the cam to be spring-pressed into engagement with the shaft 10. The shaft acts on the engaged cam to rock the pivoted cam carrier 14 in a direction to move a connected link downward. The link 15 related to a key TK, EK or MK thereupon acts through a linkage 16 to propel a type bar 17 toward the platen PL. Near the end of its stroke, the type bar strikes a universal bar 18 to actuate escapement control lever 19, whereby character spacing of typewriter carriage TC follows recording. The link 15–SP related to the space bar is effective upon depression of the space bar to operate a linkage 20 acting through escapement control lever 19 to cause character spacing. Operation of the carriage return key CR brings about line spacing and carriage return in a manner such as disclosed in Patent 1,995,614. Operation of key TAB causes tab spacing of the carriage TC in accordance with the setting of tab stops 22, in a manner such as disclosed by Patent 1,935,436.

Figure 3:
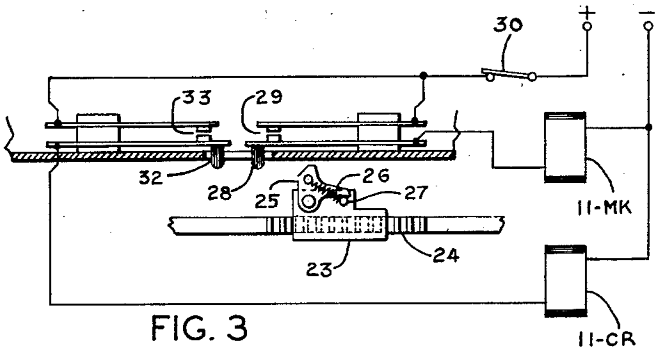
FIG. 3 is a plan view of means for successively energizing the monitor signal and carriage return solenoids of the above typewriter.

FIG. 3 shows means whereby the monitor signal key and the carriage return key may be automatically operated in sequence. The right hand margin stop 23 on carriage rack 24 pivotally carries a by-pass pawl 25 urged by a light spring 26 against a pin 27 on the margin stop. When the carriage reaches a position one character spacing step away from the end-of-line position, the pawl 25 acts on an insulating button 28 to close spring-loaded contacts 29. Closure of contacts 29 completes a circuit from the + side of a voltage source through a hand switch

30, contacts 29, and solenoid 11–MK to the — side of the voltage source. Resulting energization of 11–MK depresses monitor signal key MK. Following recording of the monitor signal pattern, a character spacing step of the carriage occurs. This brings pawl 25 against an insulating button 32, closing spring-loaded contacts 33 to complete a circuit through solenoid 11–CR. Consequently, key CR is depressed to cause line spacing of the record and carriage return. During return of the carriage, pawl 25 pivots freely past button 28 without causing closure of contacts 29, spring 26 being weaker than the resisting force of the contact blades of 29.

Figure 10:
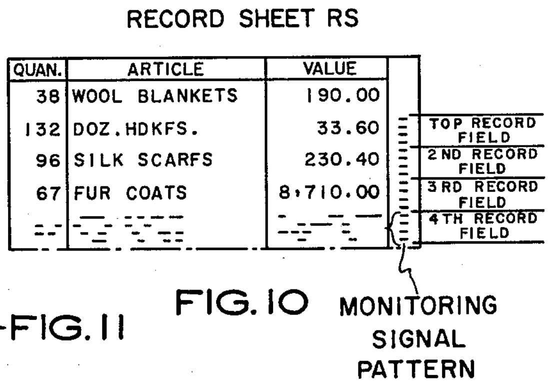
FIG. 10 shows a sample data record prepared by the machine of FIGS. 1 to 9; it is understood that the magnetic signals are invisible, those in the 4th record field being shown only to aid the disclosure.

FIG. 10 shows a sample data record RS on which the apparatus has printed data and magnetically recorded the coding signal patterns, each line of printing being codally represented by magnetic signal patterns in a record field below the line. The record sheet used here is of paper or card stock to the rear surface of which is bonded a coating of magnetic material such as iron oxide. Other kinds of magnetic records may be used. The record RS as shown has the dimensions of a common tabulating card but may obviously be any other length and width.

Figure 11:
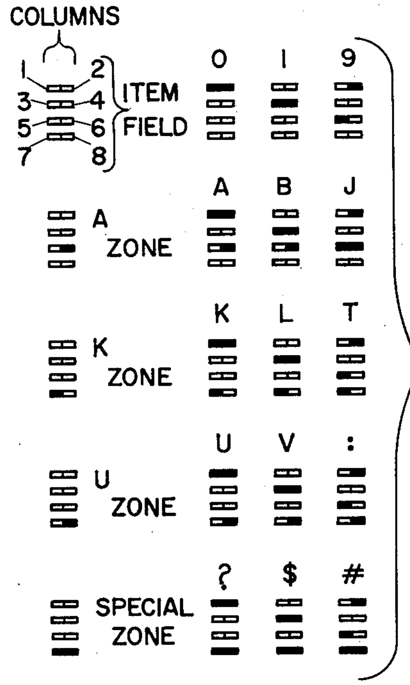
FIG. 11 shows elements of the chosen item designating code.

Any suitable data code may be used. In the present case, a combinational code, elements of which are shown in FIG. 11, is chosen. This code provides for representation of an item such as a letter, digit, or other symbol, in an item field consisting of two touching columns, each column containing four index areas or positions. The index positions are conveniently denoted as positions 1 to 8. There are five code zones, the top one in FIG. 11 being the numerical zone and the others being the A, K, U and Special zones. Typical item representations in each zone are shown. Digits 0 to 9 are represented by magnetic spots or signals in various pairs of index positions 1 to 5. Item representations in the other zones add a zone characterizing signal or signals to the numerical code. Thus, in the A zone, letters A to J are represented by the addition to the numerical codes of the common "6" signal, the K zone adds the "7" signal to the numerical codes to designate letters K to T, the U zone represents letters U to Z and some punctuation marks by the addition of the "8" signal, and the Special zone provides for representation of various symbols by the addition of zone signals "7" and "8."

It is clear that each record field (FIG. 10) comprises a row of item fields bearing magnetic signal patterns codally representing items according to the chosen code. The lateral spacing between item fields is dictated by the character spacing step of the typewriter carriage.

Figures 4, 5, 6, 7, 8, 9:
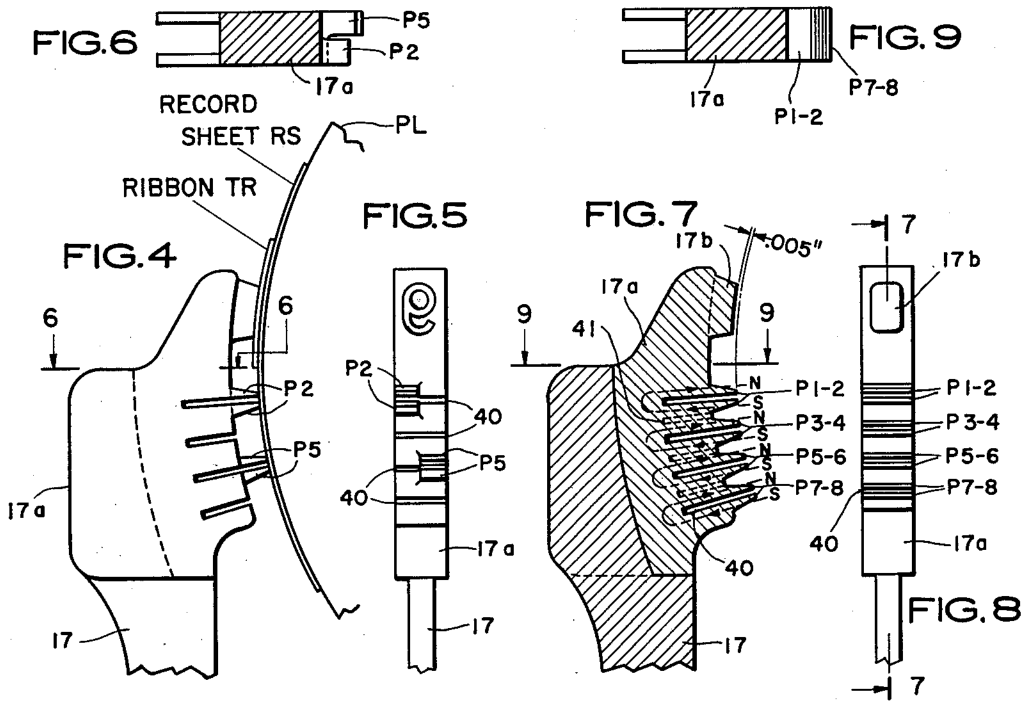
FIG. 4 is a detail view showing on an enlarged scale the head of the "9" type bar in actuated position, with its type lug and permanent magnet combination impacting the record.
FIG. 5 is a face view, on an enlarged scale, of the "9" type head.
FIG. 6 is a section along line 6—6 of FIG. 4.
FIG. 7 is a section along line 7—7 of FIG. 8.
FIG. 8 is a face view, on an enlarged scale, of the type head with magnets for recording a monitor signal pattern.
FIG. 9 is a section along line 9—9 of FIG. 7.

Referring to FIGS. 1 and 4 to 9, each type bar is rigidly capped by a type head 17*a* made of permanent magnet material such as Alnico, hardened steel or other material of high magnetic permanence. The type head blank is provided with a type lug 17*b* and, below the type lug, is formed with four equally vertically spaced initially uncut horizontal ribs. Each of these ribs is then horizontally bisected by a slit 40 in the order of .010 inch in height and extending deeply into the body of the blank. The blank is then hardened and polarized magnetizing force applied to the separated halves of each rib, with the effect of forming four virtually U-shaped permanent magnets. Each such magnet is constituted by an air gap, the slit 40, and by pole pieces consisting of the sections of the blank bounding the slit and terminating in the symmetrical halves of a bisected rib. The halves of each rib thus form the permanent magnet head with coplanar pole ends or tips. At this stage of manufacture, the type head blank is as shown in FIGS. 7 to 9, with four permanent magnets adapted to cover all eight index positions of an item field (FIG. 11). The top magnet P1–2 covers index positions 1 and 2, the second magnet covers positions 3 and 4 and is designated P3–4, the third magnet P5–6 covers positions 5 and 6, and the bottom magnet P7–8 covers positions 7 and 8. All four of these magnets are polarized alike, the polarization shown in FIG. 7 being that adopted for producing positive or operative item coding magnetic signals, i.e., signals of a polarity to which the playback or analyzing means will be made responsive. Cuts 41 may be made between adjacent permanent magnets on a type head to improve the isolation between the magnets. It is suggested that instead of the type heads being made of alnico or hard steel, they may be powdered metal castings having high magnetic retentivity.

After a type head has been brought to the stage shown in FIGS. 7 to 9, the permanent magnets P are selectively cut down to form the code combination for the item borne by the related type lug. FIGS. 4 to 6 show, for example, the "9" type head. The top permanent magnet has been cut down to leave only the left half P2 operatively projecting, as required to record a magnetic spot in index position 2. The second magnet has been cut down flush with the face of the type head. The third magnet has been partially cut away to leave only the half P5 operatively projecting and adapted to apply a magnetic spot to index position 5. The bottom permanent magnet has been cut down flush with the face of the type head. Thus, the "9" type head has the combination of magnets P2 and P5 effective upon impact with the record on the platen PL to impress the index positions 2 and 5 of an item field with magnetic spots, whereby item 9 is represented in the item field (see FIG. 11). Similarly, the other type heads have their magnets variously cut down to form the required code combinations of magnets for recording different item coding combinational patterns of magnetic signals in accordance with the code indicated in FIG. 11.

With respect to the type head associated with the monitor signal key MK (FIG. 2), its four magnets are left in complete state. Hence, this type head is as shown in FIGS. 7 to 9, and its operation will result in impressing all eight index positions of an item field with magnetic spots to constitute the monitor signal pattern shown in FIG. 10.

The erase type head, associated with the erase key EK, has its four magnets left in complete state, the same as the monitor signal type head, so as to cover all eight index areas of an item field. In contrast with the other type heads, the erase type head has its magnets polarized reversely to the polarization indicated in FIG. 7. Hence, operation of the erase type head will result in applying reverse magnetic effects to all eight index areas of an item field, canceling any operative magnetic signals from the field. Any item coding combinational pattern of signals may thus be erased from an item field by operation of the erase type head. The reverse magnetic signals left in the item field by the erase magnets will be ignored by the playback or analyzing means, for the data record, which will be made sensitive only to the operative polarity magnetic signals of item coding and monitor signal patterns. The type lug on the erase type head bears an overprint design such as an X mark for rendering illegible the printed character whose magnetic coding pattern is being erased.

The data record RS is supported on the platen PL in a conventional manner. In FIG. 4, TR designates the usual ink ribbon. Depression of an item key TK (FIGS. 1 and 2) is effective to impel the associated type bar toward the platen. The type lug 17*b* on the type head impacts the record through the ink ribbon to print the item in legible form. Concurrently, the permanent magnet combination on the type head impacts the record to impress the item coding magnetic signal pattern in an item field one line space below the printed item. It is to be noted that the pole tips of each permanent magnet on a type head project forwardly of the associated type lug a small distance, in the order of .005 inch, as indicated in FIG. 7. This allows for the thickness of the ink ribbon and, more important, permits the pole tips to penetrate well into the thickness of the record material. Hence, the pole tips of each magnet, upon recording impact, closely approach the magnetic coating on the rear of the record sheet and apply a concentrated magnetic flux, substantially directly across the pole tips, to the section of the magnetic coating bridging the pole tips. Such section, which defines an index area, is thereby impressed with a magnetic signal spot. Assume, for instance, that a relatively thick record such as a tabulating card (.065 inch thick) is being used and the pole tips penetrate to within, say, .002 inch of the magnetic coating. A concentrated magnetic flux then extends from the north pole tip through the .002 inch gap therefrom to the magnetic coating, thence through the section of the coating covering the .01 gap between the poles, and across the .002 distance to the south magnetic pole tip. A strong magnetic spot of north-south polarity is thus produced in an index area of the record. A gap of say .012 to .015 inch between the pole tips of a magnet, instead of the indicated .01 inch gap, may be advantageous in providing a wider magnetic tolerance.

The closer the pole tips approach the magnetic coating on impact, the stronger is the resulting magnetic signal, the closeness of the approach being determined by the toughness and thickness of the record material. The depth of penetration of the pole tips into the record material can be fairly well maintained and reasonable variation in this respect is not too critical. The type lugs 17*b* more or less act as stops to control the depth of penetration by the pole tips and the number of pole tips impacting the record at any given time is fairly constant, varying between two and four pole tips. Some loss in magnetic strength is to be expected after the machine is first put into operation, but the magnetic strength should remain constant at the lower level from then on. Should the magnetic strength be found too low at any time, the pole tips can be re-magnetized.

After the last character on a line has been recorded, the record advances to the location for a monitor signal pattern. At this point, solenoid 11–MK is energized, as already explained, depressing key MK to cause the monitor signal pattern consisting of four double-span magnetic spots to be recorded, each spot in line with one of the four index rows of a record field. The type lug on the monitor signal type head may be left intact to print a dark rectangle on the record as an incident to magnetic recording of the monitor signal pattern. This type lug will serve as a stop to limit penetration of the monitor signal magnets into the record material. If no mark is to be printed when the monitor signal pattern is recorded, the type lug on the monitor signal type head is cut away and the penetration of the related magnets into the record material will then be limited by the toughness of the record material and the striking force of the type head. Following recording of the monitor signal pattern, solenoid 11–CR is automatically energized and line spacing and carriage return occur.

If a character is to be altered or erased, the printed form of the character is brought to printing position. This brings the related item field bearing the magnetic signal pattern of the character to magnetic recording position. The error key EK is then operated, impacting the associated type head against the record. The type lug on the head applies the overprint mark to the printed character and the erase magnets cancel the corresponding character coding signal pattern. The overprint furnishes a visible indication to the operator of which item has been erased. If the erase key has been inadvertently operated to erase an item by mistake, the overprint will show the location of the wrongly erased item. On the other hand, characters within a group intended for erasure may have been missed by the operator and this fact will be evidenced by the absence of overprints from the printed form of the missed characters. After erasure of an item, it may be replaced by a desired item. The operator will first rub out the overprint and the overprinted undesired item and then bring the erased space to recording position. Operation of an item key will then result in the printing of a new item in the space and in the recording of its magnetic coding pattern within the related item field.

Attention is called to the fact that the type heads as shown in FIGS. 4 to 9 are about four times actual size. The type size used may be that of common types in a standard typewriter. The overall vertical span of four permanent magnets on a type head such as shown in FIGS. 7 and 8 will be commensurate with the vertical distance between successive lines of printing. The horizontal span of each full width permanent magnet is commensurate with a character space. Using a line spacing of four to the inch, that indicated in FIG. 10, a liberal clear space of slightly less than 1/16 inch is had from one signal position to the next in the same column. With a line spacing of 5 to the inch, the permanent magnets would be closer together and the clear space between signal positions in the same column would be about .05 inch. The number of lines to the inch may be increased only to a degree which will still permit effective isolation of adjacent magnetic fields on a type head.

FIGS. 12 to 22 show an alternative apparatus using a single set of permanent recording magnets for different items. The recording magnets, permanent erasing magnets, and associated electromagnets are all incorporated in a magnetic recording unit attachable to a typewriter. Any standard typewriter fitted with a special mount for the attachable unit may be used. Key contacts will be associated in a known manner with the typewriter keyboard. Operation of keys to type items on a magnetic record carried by the platen will close key contacts to establish circuits in an item encoding network for energizing the electromagnets to actuate the permanent recording magnets in various groupings so as to impress the record with magnetic signal patterns encoding the typed items.

Figure 12:
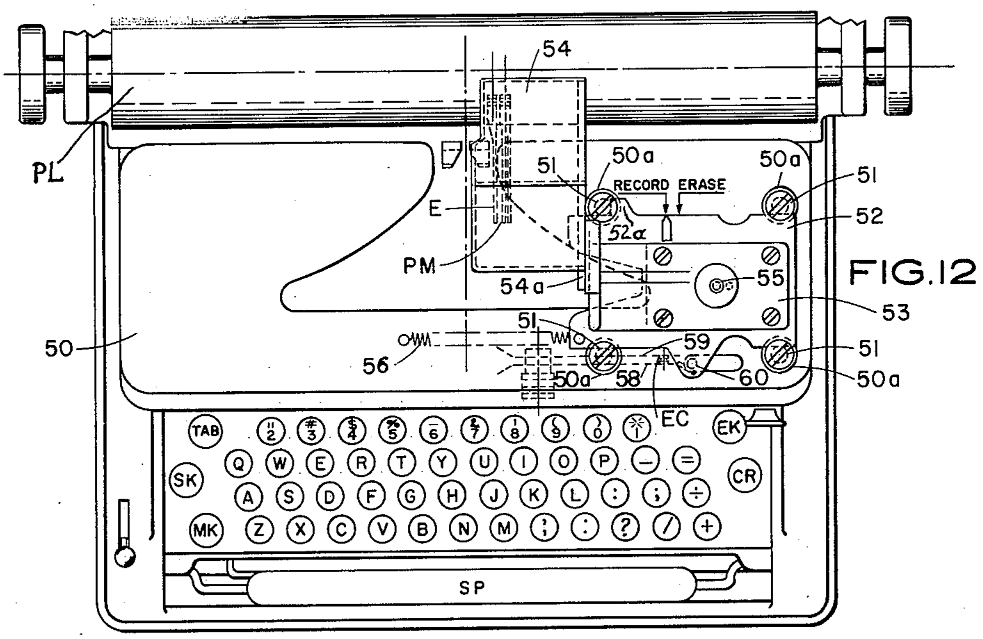
FIG. 12 is a general plan view of an alternative embodiment of the invention, involving a magnetic recording and erasing unit as an attachment to a typewriter.

The typewriter in FIG. 12 may be assumed to be of the kind considered for the first embodiment. The key contacts, shown diagrammatically in FIG. 22, may be associated with the keys in the manner indicated in, for example, FIG. 9 of Patent No. 2,403,005. Unlike the first embodiment, upper and lower case typing is possible, and the keyboard includes a case shift key SK. The code can be enlarged to a desired extent to differentiate between upper and lower case items.

Figures 13, 14, 15:
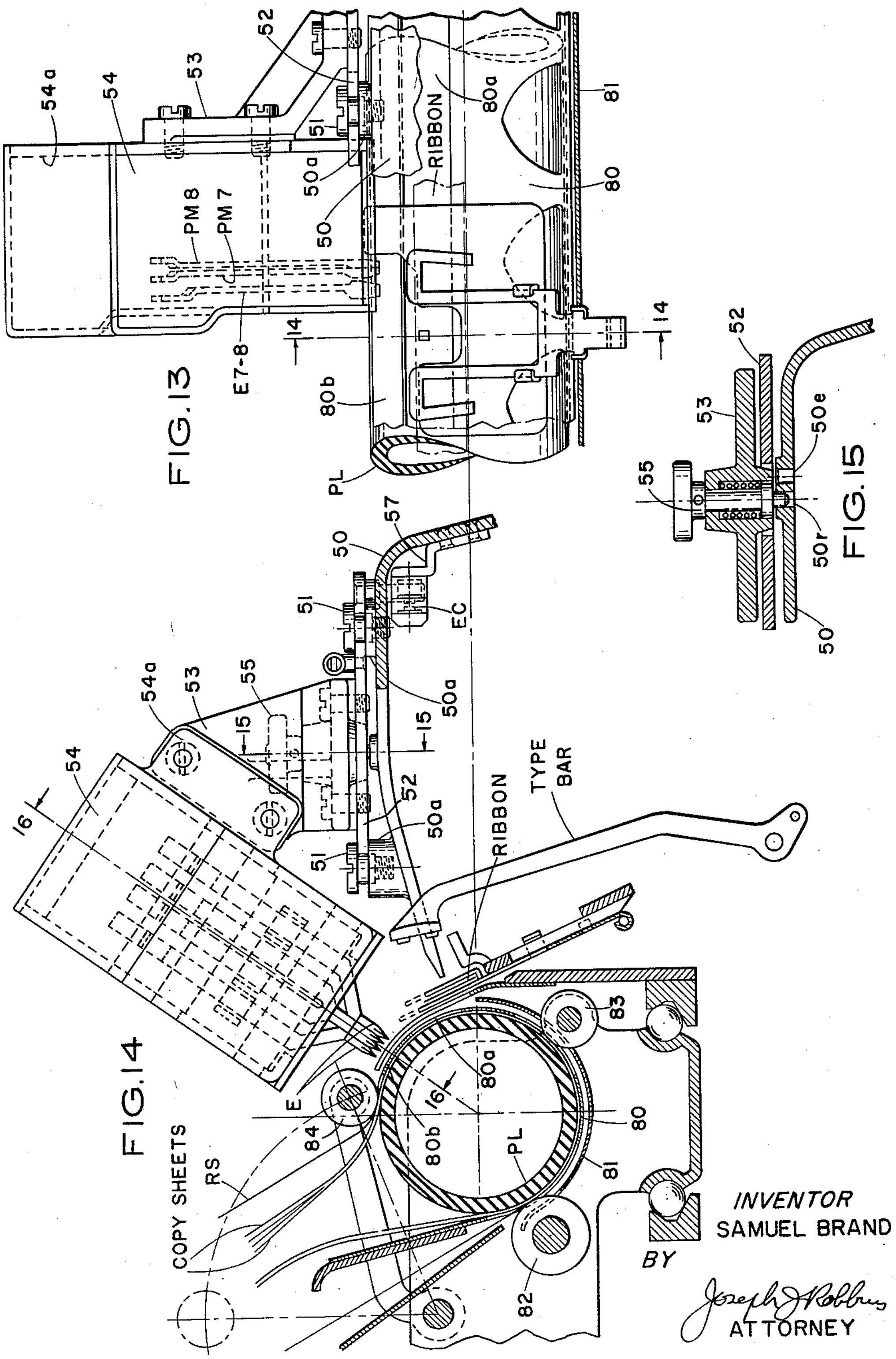
FIG. 13 is a front elevation of a central portion of the FIG. 12 apparatus in full size, parts being broken away and sectioned to aid the disclosure.
FIG. 14 is a section, essentially along line 14—14 of FIG. 13, through the apparatus.
FIG. 15 is a section essentially along line 15—15 of FIG. 14.

A special type bar cover (FIGS. 12 to 15) is substituted for the regular cover. Cover 50 is formed with four posts 50*a* at the corners of a rectangle. Threaded into these posts are screw studs 51. The base plate 52 of the magnetic recording unit is confined between the heads of the studs and the top surfaces of the posts, with smooth shank portions of the studs engaging parallel front and rear edges of base plate 52 to guide the base plate for adjustment, parallel to platen PL, between "record" and "erase" positions. Fixed on the base plate is a right angle bracket 53. A housing 54 for the permanent magnets and associated electromagnets has its right side wall 54*a* fastened to the vertical leg of bracket 53. The bracket thereby supports the housing completely from its right side in a position clear above and inclined toward the front of typewriter platen PL, as seen in FIG. 14. Mounted in the bracket 53 above the cover 50 is a spring-depressed latch pin 55 which reaches down through an opening in base plate 52 into engagement with a hole 50*r* or 50*e* in the cover. With the latch pin seated in 50*r*, it is locking the magnetic recording unit in "record" position. To adjust the recording unit to "erase" position, the operator grasps the head of the latch pin to lift it from hole 50*r* and then slides the unit to the right until the latch pin springs into the hole 50*e* (FIG. 15). This lock the recording unit in "erase" position. Should the operator release the recording unit between its two positions, it will be returned to "record" position by a spring 56 between cover 50 and base plate 52. Movement of the recording unit to the left beyond its "record" position is prevented by contact of a rearward projection 52*a* of the base plate with the rear, left screw stud 51. Directly under cover 50 and attached to it, through insulation, by a bracket 57 are contact blades 58 and 59 provided with coacting contacts EC. A pin 60 extending down from base plate 52 engages the inclined insulated end of blade 58 to hold contacts EC open while the recording unit is in "record" position. When the recording unit is adjusted to "erase" position, pin 60 permits contacts EC to close, completing a circuit through a lamp EL (FIG. 22) which will be in sight of the operator to signal the fact that the recording unit is in "erase" position.

The code chosen for the modification is similar to the one used for the first embodiment and involves an item field with eight index positions (see FIG. 11). To record items in this code, there is a set of eight permanent magnets PM1 to PM8 (see particularly FIGS. 16 and 17) made of alnico or other material of high magnetic permanence. These magnets are constructed as elongated pins, each terminating at its lower end in a bipolar recording head strongly magnetized with the polarity indicated in FIG. 21 for producing an operative magnetic signal in an index position of the magnetic record. The shanks of the magnets are oblong in cross section and pass through guide holes of conforming cross section in upper and lower blocks 62 mounted to the left side wall of housing 54, whereby the magnets are slidably guided for lengthwise movement toward the record RS on platen PL. The heads of magnets PM are arranged in two columns, each with four heads, corresponding to the arrangement of index positions in an item field. The number of the magnet indicates the index position covered by its recording head; e.g., PM1 covers index position 1. The eight recording heads are closely bunched in flat sided interengagement, with flat ends of one column of heads against flat ends of the other column. The set of recording heads thus occupies a minimum area and provides for recording in an item field of small size with touching columns of index positions.

To the left of magnets PM is a single column of four permanent erase magnets E, each in the form of an elongated pin of oblong cross section, guided similarly to the recording magnets for lengthwise slidable movement in the blocks 62. The erase magnets are of material similar to the recording magnets and terminate at their lower ends in bipolar erasing heads, each magnetized with a polarity reverse to that of the recording heads. Each erasing head is twice as wide as a recording head. E1–2 is adapted to impact index positions 1 and 2, E3–4 to impact positions 3 and 4, E5–6 to impact positions 5 and 6, and E7–8 to impact positions 7 and 8. All four erase magnets will be simultaneously impacted with an item field to cancel any operative signals therefrom.

Individual springs 64 stretched between the permanent magnets, PM and E, and bars 65, depending from the top wall of the housing 54, normally maintain the permanent magnets in raised positions.

Actuation of recording magnets PM1 to PM8 is effected upon energization of respectively associated electromagnets M1 to M8. The electromagnets are arranged in two tiers, each within a yoke 66, the electromagnets and yokes being secured inside the housing 54 to its right side wall 54*a*. The armatures of the electromagnets are parts of bell crank levers 67 pivoted on rods 68. Levers 67 in the upper row are associated with the electromagnets M2, 4, 6, and 8 and rest on lugs 69 of the permanent recording magnets PM2, 4, 6, and 8 (see FIGS. 16 and 20). Levers 67 associated with the lower tier of electromagnets, M1, 3, 5 and 7 rest on the fronts of looped lugs 70 extending from permanent magnets PM1, 3, 5 and 7 and detouring around and to the front of PM2, 4, 6 and 8. Upon energization of an electromagnet M1 to M8, its armature lever 67 depresses the associated permanent recording magnets, against the force of a spring 64, to impact its recording head with an index position of an item field of the magnetic record on the platen to impress an operative magnetic signal in the index position.

The four erase magnets E are under the common control of a single large electromagnet EM mounted inside a yoke 72 which is fastened, above the electromagnets M, to the side wall 54*a* of the housing 54 (see FIGS. 16 and 18). Armature lever 73 of electromagnet EM is pivoted on a fixed rod 74 and provided with a bail bar 73*a* resting on angle pieces 75 fixed to the erase magnets. Upon energization of electromagnet EM, all four permanent magnets E are depressed in unison by the bail bar 73*a* into impact with all the index positions of an item field.

Adjustable bail bars 76 are located above the armature levers of the electromagnets E and EM to determine the retracted positions of the armature levers and to serve thereby to regulate the intensity of impact of the permanent magnet heads with the data record.

As may be understood from FIG. 12, with the magnetic recording unit mounted on the typewriter, the operator's view of the typing is little obstructed. The item field at the magnetic recording station is located about ½ inch above and to the right of the printing position (see full size views, FIGS. 13 and 14). When the magnetic recording unit is in its "record" position, the two columns of magnets PM are at magnetic recording station, facing the item field at this station and ready to impress this item field with the encoding magnetic signal pattern of the item to be printed in the character space at printing position. As a line of items is typed on the data record, a line of related item coding patterns is recorded by magnets PM in a row of item fields successively stepped to magnetic recording station, such recorded row of item fields constituting a record field.

It may be desired to duplicate the typing on the magnetic record upon the usual carbon copy sheets. In the present case, this must be done without allowing the impacts of permanent magnets PM and E to produce carbon impressions on the copy sheets. For this purpose, instead of being equipped with the usual single paper guide around the platen, the typewriter is equipped with two paper guides, an inner guide 80 and an outer guide 81 (FIGS. 13 and 14). The inner guide is formed with a long horizontal slot 80*a* extending along the printing line. Above the slot, the inner guide is left with a long horizontal strip 80*b* opposite the permanent magnets and integrally joined at its two ends, outside typing range, with the main portion of the inner guide below the slot. The carbon copy sheets will be inserted from the rear of the platen PL, into the space between the platen and the inner guide. At the same time, the data record RS will be inserted from the rear of the platen into the space between the inner and outer guides. The data recoad and copy sheets will be fed around the platen together by the rear feed rolls 82 and the front tension rolls 83 and emerge, as shown in FIG. 14, above the platen and kept in place by the platen bail pressure rolls 84. The copy sheets will have been passed under the guard strip 80*b* while the data record RS will have been fed over the guard strip. In entering new sheets around the platen, the top edges of the copy sheets and carbon paper may tend to enter slot 80*a* and fail to get under the guard strip 80*b*. The guard strip, however, being light and flexible, can be easily lifted by the operator and the top edges of the copy sheets and carbon paper be tucked under the strip to be fed into place under pressure rolls 84. The slot 80*a* exposes the copy sheets to the blows of the types so that the typing of items on the magnetic data record RS produces carbon impressions on the copy sheets. On the other hand, the guard strip 80*b* covering the copy sheets takes the force of impacts from the permanent magnets when striking the magnetic data record and prevents these impacts from producing transfer impressions upon the copy sheets.

The apparatus in FIGS. 12 to 21 will be explained further with particular reference to the circuit diagram, FIG. 22. Each item key when depressed to type an item closes a pair of key contacts *a* and *b*. The *b* contacts of the several digit keys respectively connect to relays R0 to R9. Each relay upon energization closes a pair of relay contacts leading to a pair of the electromagnets M1 to M5 identified by the reference numbers of the relay contacts. For instance, operation of the key 9 closes its *b* contacts to establish the circuit of the relay R9 which, in turn, closes associated relay contacts "2" and "5" to separately complete the circuits of M2 and M5. The energization of M2 and M5 results in the actuation of the permanent recording magnets PM2 and PM5 to impress operative magnetic signals in index positions 2 and 5 of an item field. The combination of these two signals constitutes the encoding pattern for digit 9 (see FIG. 11).

The *b* contacts of the keys in the A, K, U and Special zones connect to relays R0 to R9 similarly to the *b* contacts of the digit keys. In addition, the closure of the *a* contacts of any key in the A zone picks up M6 directly, so that the code patterns of the items in the A zone will include the common signal "6" and various digit signal combinations; e.g., the J encoding pattern adds the "6" signal to the digit 9 combination of signals "2" and "5" (see FIG. 11). In the K zone, all the key contacts *a* lead to M7, so that the encoding patterns will include the common zone signal "7." In the U zone, the key contacts *a* are common to the circuit of M8, whereby the encoding patterns will include the zone signal "8." The key contacts *a* in the Special zone have their common side in circuit with a relay R11, the relay contacts of which lead separately to M7 and M8; hence encoding patterns of this zone all include the pair of signals "7" and "8."

The shift key operation can be made to control the encoding network for differentiating the encoding patterns of any number of upper and lower case items. In the present case, the code is extended by the shift key to distinguish upper case items of the digit row from the lower case digit items. With the shift key SK down, it is closing its key contacts *a*, bringing a relay R10 into circuit with the common side of the key contacts *a* in the digits row. The contacts of this relay separately pick up M6 and M7; hence, the encoding patterns of the upper case items of the digits row will add the signals "6" and "7" to various digit signal combinations.

Automatic recording of a monitor signal pattern followed by automatic carriage return operation will take place, as in the first embodiment. Contacts 29 and 33 and their operating element 25 (FIG. 3) are diagrammatically shown in FIG. 22. When the last item coding pattern has been recorded in a record field, the carriage steps ahead and element 25 closes contacts 29, making the circuit of solenoid 11–MK. The solenoid closes associated contacts *a*, *b* and *c* to pick up M6, M8 and R3. The contacts of R3 pick up M2 and M4. Thus a monitor signal pattern of signals "2", "4", "6" and "8" is applied to each record field. Solenoid 11–K also has depressed key MK (FIG. 12); hence, a block impression will be printed at the end of each line of printed items concurrently with recording of the monitor signal pattern and the carriage will then step to the end-of-line position, whereupon element 25 will close contacts 33 to complete the circuit of solenoid 11–CR (FIG. 22). Key CR will operate, causing carriage return and line spacing to take place.

To erase any unwanted item coding pattern from an item field, the magnetic recording unit is first adjusted to its "erase" position (FIG. 12), setting the erase magnets E at magnetic recording station in confrontation with an item field bearing the encoding pattern of the printed item at printing position, thus, by bringing the printed form of the unwanted item to the printing position, the item field bearing the encoding pattern for the unwanted item is brought to the magnetic recording station in confrontation with the heads of the erase magnets now adjusted to this station. The erase key EK is now operated, closing erase key contacts EK*a* (FIG. 22) to establish the circuit of the electromagnet EM. Consequently, the four erase magnets E (also see FIGS. 16 and 17) are depressed in unison to impact all the index positions of the item field at the recording station, canceling any unwanted item coding pattern therefrom. As in the first embodiment, the erase type bar will bear an overprint type to render the printed form of the unwanted item illegible, thus marking the location of the canceled item.

Attention is called to the fact that the permanent magnets PM and E have their magnetic flux confined to their bipolar contact ends or heads. Each such head is, in effect, a U-form magnet constituted by coextensive pole pieces separated by an air gap and joined at the rear by the section immediately above the bight of the air gap, as may be understood from the dotted polarity-indicating line in FIG. 21. It follows that the recording or erasing heads need not be integral terminal portions of the rods guided in blocks 62 (FIG. 16) but may be separate pieces of alnico or like material rigidly fixed to the lower ends of carrying rods of non-magnetic material.

It is understood that while the magnetic recording unit has been disclosed as controlled by a typewriter, it may be controlled instead by a ten key accounting machine, by a key punch, or other such unit.

While features of the invention have been shown and described in connection with specific embodiments, it is to be understood that the invention may take form in other embodiments and that various changes may be made by those skilled in the art without departing from the principle of the invention. It is intended therefore to be limited only as indicated by the following claims.

I claim:

1. A typewriter structure having a platen supporting a record sheet for intraline steps of feed to present character spaces of a line successively to a typing position and item fields of a parallel line successively to a magnetic recording position offset from the typing position, type bars respectively mounting type heads of magnetic material, each integrally provided in fixed offset relation to a character type with a corresponding character coding combination of bi-polar permanent magnet heads for magnetic recording impact with an item field at the magnetic recording position concurrently with printing engagement of the type with a character space at the offset typing position.

2. In apparatus for operating on a record sheet with a non-magnetic imprint receiving front surface and with magnetic material behind the front surface, a plurality of type and magnet bearing elements selectively movable toward the sheet, each element being provided with a character type effective upon movement of the element toward the sheet for striking the front surface of the sheet to print a character thereon, each element also being provided in fixed relation to the type thereon with a character coding pattern of permanent magnet means projecting forwardly of the character type face for indenting the front surface of the sheet to attain close magnetic recording proximity to the magnetic material behind the front surface for impressing the magnetic material with a magnetic character coding designation upon printing engagement of the type face with the front surface of the sheet.

3. Apparatus to print legible characters in character spaces along a line of a magnetic record sheet and to record concurrently on this sheet character coding combinational patterns of magnetic signals at index areas in a line of item fields parallel to the line of character spaces, comprising a plurality of movably mounted type and magnet bearing elements, each provided with a character type and in fixed offset relation thereto with a corresponding character coding permanent magnet arrangement respectively for printing impact with a said character space on said sheet and concurrent magnetic recording impact with a said item field offset on this sheet from the character space to impress on this field the combinational coding pattern of magnetic signals for the printed character, and operating means including character selecting means for selectively actuating said elements into printing and magnetic recording impact with said sheet, said type and magnet bearing elements being of magnetizable material integrally formed with polarized permanent magnet recording heads projecting forwardly from the elements in various character coding combinational patterns and constituting the permanent magnet arrangements.

4. Apparatus to print legible characters in character spaces along a line of a magnetic record sheet and to record concurrently on this sheet character encoding combinational patterns of magnetic signals at index areas in a line of item fields offset from and parallel to the line of character spaces, comprising a plurality of movably mounted type and magnet bearing elements, each provided with a character type lug and in fixed offset relation thereto with a corresponding character coding permanent magnet arrangement respectively for printing impact with a said character space on said sheet and concurrent magnetic recording impact with a said item field offset on this sheet from the character space so as to impress on this field the encoding pattern of magnetic signals for the printed character, and operating means including character selecting means for selectively actuating said elements into printing and magnetic recording impact with said sheet, each of said type and magnet bearing elements being of magnetizable material formed integrally with a type lug and with polarized magnetic recording heads in a character coding pattern and constituting a permanent magnet arrangement corresponding to the character on the type lug, the recording heads in the pattern being each comprised of spaced opposite polarity projections having coplanar tips spaced for bridging by an index area and producing a magnetic field delimited to the polar region and isolated from the type lug on the same type and magnet bearing element.

5. Apparatus as defined in claim 4, some of the recording heads having a width commensurate with the width of a single index area and others having a multiple width commensurate with the aggregate width of a plurality of contiguous index areas, consistently with a chosen code of character representation.

6. In apparatus to print items and magnetically record item coding combinational patterns of magnetic signals, a plurality of movably mounted recording blocks selectively operable into printing and magnetic recording impact with record means, each said block composed of magnetizable material integrally formed on its recording face with an item type and also integrally formed adjacent the type with a corresponding item coding combinational relief pattern of permanently polarized magnetic signal impressing heads presenting complementary pole tips toward the record means and producing magnetic fields delimited to the polar regions and isolated thereby from the adjacent type on the same block.

7. In apparatus for impressing magnetic signal patterns upon index areas in item fields of a record medium to represent various items in a combinational code of item representation, a plurality of movably mounted similarly polarized permanent magnets operable to strike item coding patterns of index areas of the item fields to impress the item fields with desired item coding patterns of magnetic signals of one operative magnetic orientation, in combination with erasing means including movably mounted permanent magnet means polarized reversely to said permanent magnets and sized for striking all the index areas of an item field simultaneously for canceling any item coding magnetic signal pattern therefrom, means for selectively actuating said permanent magnet erasing means into magnetic signal pattern canceling impact with any desired item field of the record medium, and printing means acting concomitantly with cancellation of an item coding signal pattern from an item field for visibly mark-indicating this item field.

8. Apparatus to record item coding combinational patterns of magnetic signals at index areas in item fields of a record, comprising a plurality of permanent magnets each having a recording head for impacting at least one index area, each said magnet normally being in magnetically ineffective retracted relation to the record and having an alternative impact relation in which its recording head impresses an index area with a polarized magnetic signal, operating means including item selecting means for producing the impact relation between an item coding arrangement of said permanent magnets and index areas in an item field to impress the item field with a selected item coding magnetic signal pattern, the recording heads of said magnets being of like magnetic polarization to produce item coding signals of one operative magnetic orientation, in combination with erasing means provided with permanent magnets having erase heads polarized reversely to the recording heads and sized and arranged for impact with all the index areas of an item field, and means for moving the erasing magnets concurrently from a magnetically ineffective retracted relation to the record into an impact relation in which the erase heads are effective to impress all the index areas of an item field with magnetic signals of inoperative signaling polarity and thereby to erase any item coding magnetic signal pattern from this item field, the apparatus further including printing means operable under control of the item selecting means to print the selected items upon the record concurrently with the magnetic recording of their encoding signal patterns by the permanent magnet recording heads, the printing means also including means for printing an overprint mark upon a printed item concurrently with the magnetic erasure of its encoding signal pattern by the erase heads.

References Cited in the file of this patent

UNITED STATES PATENTS

| | | |
|---|---|---|
| 2,333,463 | Bryce | Nov. 2, 1943 |
| 2,350,893 | Hofgaard | June 6, 1944 |
| 2,511,121 | Murphy | June 13, 1950 |
| 2,540,654 | Cohen | Feb. 6, 1951 |
| 2,561,476 | Lang | July 24, 1951 |
| 2,567,812 | Hickman | Sept. 11, 1951 |
| 2,672,395 | Lewis | Mar. 16, 1954 |
| 2,718,849 | Dresser | Sept. 27, 1955 |
| 2,743,988 | Allyn | May 1, 1956 |
| 2,751,433 | Linger | June 19, 1956 |
| 2,784,392 | Chaimowicz | Mar. 5, 1957 |
| 2,788,879 | Rand | Apr. 16, 1957 |
| 2,791,310 | Jones | May 7, 1957 |
| 2,938,758 | Crosman | June 7, 1960 |